(12) United States Patent
Zehavi et al.

(10) Patent No.: US 6,978,591 B2
(45) Date of Patent: Dec. 27, 2005

(54) TREE TRUNK SHAKER

(75) Inventors: Eitan Zehavi, Kiryat Tivon (IL); David Chiel, Afula Illit (IL)

(73) Assignee: Dotan Ltd., Migdal Haemek (IL)

( * ) Notice: Subject to any disclaimer, the term of this patent is extended or adjusted under 35 U.S.C. 154(b) by 0 days.

(21) Appl. No.: 10/469,726

(22) PCT Filed: Feb. 26, 2002

(86) PCT No.: PCT/IL02/00147

§ 371 (c)(1),
(2), (4) Date: Aug. 28, 2003

(87) PCT Pub. No.: WO02/069693

PCT Pub. Date: Sep. 12, 2002

(65) Prior Publication Data

US 2004/0079065 A1    Apr. 29, 2004

Related U.S. Application Data

(60) Provisional application No. 60/272,390, filed on Mar. 1, 2001.

(51) Int. Cl.[7] ............................................. A01D 46/00
(52) U.S. Cl. .................................... 56/340.1; 56/328.1
(58) Field of Search ............................ 56/340.1, 328.1

(56) References Cited

U.S. PATENT DOCUMENTS

| | | | | |
|---|---|---|---|---|
| 3,548,578 A | * | 12/1970 | Shipley, Jr. ................ | 56/340.1 |
| 3,656,283 A | * | 4/1972 | Shipley ........................... | 56/1 |
| 3,780,510 A | | 12/1973 | Tompkins | |
| 4,128,986 A | * | 12/1978 | Santarelli .................... | 56/340.1 |
| 4,223,515 A | * | 9/1980 | Borchard ................... | 56/340.1 |
| 4,320,618 A | * | 3/1982 | Dandl ....................... | 56/340.1 |
| 4,768,332 A | | 9/1988 | Bizzini | |
| 4,903,471 A | * | 2/1990 | Bunnelle ................... | 56/340.1 |
| 5,123,238 A | * | 6/1992 | Renehan ...................... | 56/329 |
| 5,473,875 A | * | 12/1995 | Zehavi et al. .............. | 56/340.1 |
| 5,595,054 A | * | 1/1997 | Reynolds de Sousa et al. ........................ | 56/340.1 |
| 5,927,056 A | * | 7/1999 | Renehan .................... | 56/340.1 |

* cited by examiner

*Primary Examiner*—Meredith Petravick
(74) *Attorney, Agent, or Firm*—Frishauf, Holtz, Goodman & Chick, P.C.

(57) ABSTRACT

A vehicle-carried Tree-Trunk Shaker (TTS) for harvesting tree fruit is configured to prevent the transmission of vibrations from a vibration generator (4) to the TTS and to the vehicle, and for optimal shaking efficiently. Currently, TTSs are allowed to shake multi-directionally and chaotically, convey destructive vibrations to the TTS and to the vehicle, and have low harvesting efficiency. The remedy consists of shaking the trunk only in perpendicular to a pair of jaws (6, 8) clamping the trunk (T), with a unidirectional linear vibration generator vibrating transversally to the trunk. A beam (16) is configured to support the clamping jaws and the vibration generator to form a rigid structure restricted to swivel about a vertical pivot shaft (42) coupled to the vehicle. Thereby there is allowed but a single lateral degree of freedom of motion. Possibly, two vertical pivot shafts (42, 48) are used to that end.

3 Claims, 3 Drawing Sheets

TREE TRUNK SHAKER

CROSS-REFERENCE TO RELATED APPLICATIONS

This application is a U.S. National Phase Application under 35 U.S.C. 371 of International Application PCT/IL02/00147, filed Feb. 27, 2002, which claims priority based on U.S. Provisional Application No. 60/272,390, filed Mar. 1, 2001.

TECHNICAL FIELD

The present invention relates in general to agricultural vehicle-carried tree-trunk shakers for harvesting tree fruit, and in particular to the constraining of the degrees of freedom of motion of their mechanism.

BACKGROUND ART

Tree Trunk Shakers (TTS) per se, are well known to the art. They consist usually of a vibration-generating element, a pair of jaws to clutch the trunk of a tree, and a supporting arm configured to extend the pair of jaws from a vehicle to the tree. The mechanism of the Tree-Trunk Shaker (TTS) permits the positioning and locking of the jaws on the tree-trunk, and allows the vibration generating element to impose a multi-directional regime of vibrations to the tree. However, since the shaking generated by, the vibration generator is violent and multidirectional, chains and resilient coupling elements are preferably used for connection of the vibration generator to allow movement in all possible directions, thus in all possible degrees of freedom of motion. Evidently, chains provide freedom of motion, even allowing the shaker to be thrown about chaotically. As a result, vibrations are generated in all directions, transmitted, and imparted to the vehicle, with all the detrimental effects on the TTS, on the vehicle and on the driver.

Unwanted vibrations are sometimes accepted as a price to pay against a desired superior result, but in the present case, the efficiency of the TTS is low. Obviously, TTS manufacturers strive to achieve improved tree-fruit harvesting yields, meaning shorter time of tree shaking and greater percentage of harvested fruit.

In U.S. Pat. No. 4,128,986, Santarelli describes a shaker suspended by chains as by column 3, lines 52 to 53: " . . . fixing point 3 for chains 4 by means of which the vibrating device 1 may be lifted by a tractor 4', . . . ". FIG. 1 illustrates the vibrating device as hanging on three separate chains 4 from a supporting arm 5. This mode of suspension is needed since Satarelli wants to, by column 4, lines 66 to 68 " . . . obtain vibrations the frequency of which is variable during operation substantially through an arc of 360°." Santarelli believes that multidirectional vibrations are necessary for a TTS, although the harvesting results are poor.

U.S. Pat. No. 4,223,515, invented by Borchard, discloses a "Tree shaker mounting" where the shaker 10 is suspended by a chain 30 and by a rubber block 41, as described in column 2 lines 33 to 34 " . . . suspended from it is the shaker 30 and a rubber block 41, . . . ". Borchard too prefers multidirectional shaking, in spite of the inferior harvesting results.

U.S. Pat. No. 4,320,618, by Dandl, deals with, as by the title of the Patent, a "Tree shaker attachment for vehicles" that is "interconnected with the fixed base member 16 by flexible chains 40 in order to better support the tree shaking attachment to the tractor" as in column 3, lines 24 to 26.

Dandl is also of the view that, column 1 lines 24 to 27: " . . . the unidirectional mode of vibration was generally inefficient because of the need for causing relatively violent shaking of the tree." Therefore, Dandl selects multi-directional shaking, as by column 1 lines 36 to 38 " . . . for generating a high frequency pulsation, the direction of which changes continuously through an angle of 360° arc, . . . ". In spite of his efforts, Dandl does not improve harvesting efficiency.

The background art thus professes multidirectional shaking and a freely suspended vibrator as the preferred method of operations for a TTS, even though the harvesting results are far from satisfactory.

There is thus a need for a TTS configured to ascertain optimal results for the fruit-harvesting mission but without imparting vibrations and/or shocks to the harvesting equipment and to the vehicle. Furthermore, there is also a need for the control of the vibration regime to provide not only efficient tree shaking but also overall orchard harvesting performance. In simple words, there is needed an efficient TTS machinery of rigid and robust construction, for delivering shaking vibrations to the tree while isolating the TTS and the vehicle from both shocks and vibrations

SUMMARY

It is an object of the present invention to provide a method for the unidirectional lateral and orderly shaking a tree with a Tree-Trunk Shaker (TTS) coupled to a vehicle and constrained to a single lateral pivotal degree of freedom of motion for optimal harvesting results and for prevention of shaking vibration harm to the TTS, to the vehicle and to the driver.

Another object of the invention is to implement the method for an autonomous tree trunk shaker TTS for the harvesting of tree-fruit by the vibrational shaking of the trunk, wherein the TTS is mounted on a vehicle and does neither transmit vibrations to the vehicle nor damage to the bark of the tree.

Still another object of the invention is to implement the method for tree-fruit harvesting systems comprising a TTS, a vehicle, fruit gathering means, and possibly conveyor means and a harvest-gathering container.

It is another object of the invention to provide a TTS achieving a maximal tree-fruit harvest in a minimum of time.

One object of the invention is to provide a method for constraining and coupling a TTS to a vehicle, the TTS comprising tree-trunk jaws clamping the trunk perpendicularly, and a linear vibration generator coupled to the tree-trunk jaws for shaking the trunk. The method is characterized by comprising the steps of configuring the TTS to shake the trunk laterally in perpendicular to both the trunk and to the tree-trunk jaws, and constraining the TTS to shake the trunk in one single lateral degree of freedom of motion in operative association with at least one vertical pivot coupling the TTS to the vehicle. As a further step, the tree-trunk jaws clamp diametrically opposite sides of the trunk and the linear vibration generator is configured as an integral part of the tree-trunk jaws to form a rigid front portion.

According to the invention, there is provided a method that further comprises a linking portion rigid and in longitudinal coextension with the tree-trunk jaws, the linking portion comprising a front end and rear end, front and rear being defined as, respectively, the side nearer the trunk and the side nearer the vehicle. The front end is rigidly coupled to the front portion, and a coupling portion comprising a front attachment and a rear attachment, the front attachment being coupled to the rear end of the linking portion and the rear attachment being fixedly coupled to the vehicle. The method being further characterized by comprising the step of constraining the linking portion pivotally to the coupling portion by at least one vertical pivot defining a single lateral pivotal degree of freedom of motion in perpendicular to the trunk and to the tree-trunk jaws.

Yet another object of the invention is to provide a method for constraining and coupling a TTS to a vehicle, the TTS comprising tree-trunk jaws clamping a trunk perpendicularly on diametrically opposite sides, and a linear vibration generator for shaking the trunk and integrated with one tree-trunk jaw into a rigid front portion. There is also a linking portion in longitudinal coextension with the tree-trunk jaws, the linking portion comprising a front end and rear end rigidly coupled to the front portion, front and rear being defined as, respectively, the side nearer the trunk and the side nearer the vehicle. The front end is rigidly coupled to the front portion, and a coupling portion comprising a front attachment and a rear attachment, the front attachment being coupled to the rear end of the linking portion and the rear attachment being fixedly attached to the vehicle via a structure portion. The method is characterized by the steps of configuring the TTS for shaking the trunk laterally in perpendicular to the trunk and to the tree-trunk jaws so as to transmit lateral vibrations to the trunk and to the linking portion. Thereby, the coupling portion is constrained to the linking portion by at least one vertical pivot for associative operation when shaking the trunk. In a further step, the vertical pivot coupling defines a single lateral pivotal degree of freedom of motion thereby providing maximal vibration energy to the trunk by coupling the TTS to the vehicle via the structure. It is noted that the at least one vertical pivot isolates the vehicle from vibrations generated by the linear vibration generator.

One more object of the invention comprises providing a method with a linking portion, rigid and in longitudinal coextension with the tree-trunk jaws, the linking portion comprising a front end and rear end, front and rear being defined as, respectively, the side nearer the and the side nearer the vehicle. The method also includes a coupling portion comprising a front attachment and a rear attachment, the front attachment being coupled to the rear end of the linking portion and the rear attachment being fixedly attached to the vehicle. The method is further characterized by comprising the steps of coupling the front portion to the front end of the linking portion by a first vertical pivot coupling, and coupling the rear end of the linking portion to the front attachment of the coupling portion by a second vertical pivot coupling. The TTS is thereby constrained to a single lateral degree of freedom of motion about a first and a second vertical pivot.

As another object of the invention, there is provided a method for constraining a TTS to a vehicle, the TTS comprising tree-trunk jaws clamping a trunk perpendicularly on diametrically opposite sides, a linear vibration generator for shaking the trunk and integrated with at least one tree-trunk jaw into a rigid front portion. The TTS also comprises a linking portion, rigid and in longitudinal coextension with the tree-trunk jaws, the linking portion comprising a front end and rear end, front and rear being defined as, respectively, the side nearer the trunk and the side nearer the vehicle. The TTS further comprises a coupling portion comprising a front attachment and a rear attachment, the front attachment being coupled to the rear end of the linking portion and the rear attachment being fixedly coupled to the vehicle via a structure portion, and defining a lateral direction as being orthogonal to the trunk and to the tree-trunk jaws. The method is characterized by the steps of configuring the TTS for shaking the trunk laterally so as to transmit vibrations laterally and in perpendicular to the linking portion, and constraining the front portion by a first vertical pivotal coupling to the front end of the linking portion. Furthermore, the method comprises the step of constraining the rear end of the linking portion by a second vertical pivotal coupling to the front end of the coupling portion. Thereby, there is defined a single degree of lateral freedom of motion about two vertical pivots, for providing maximal vibration energy to the trunk by coupling the TTS to the vehicle via the structure. The method is also characterized by isolating the vehicle from vibrations generated by the linear vibration generator by operative association with the first vertical pivot and the second vertical pivot.

It is a further object of the invention to provide a TTS coupled to a vehicle and comprising tree-trunk jaws clamping the trunk perpendicularly, and a linear vibration generator coupled to the tree-trunk jaws for shaking the trunk. The TTS is characterized by being configured to shake the trunk laterally in perpendicular to both the trunk and to the tree-trunk jaws, and constrained to shake in one single lateral degree of freedom of motion in operative association with at least one vertical pivot coupling the TTS to the vehicle. In the TTS, the tree-trunk jaws are clamping diametrically opposite sides of the trunk, and the linear vibration generator is configured as an integral part of the tree-trunk jaws to form a rigid front portion.

One other object of the invention is to provide a TTS further comprising a linking portion, rigid and in longitudinal coextension with the tree-trunk jaws, the linking portion comprising a front end and rear end, front and rear being defined as, respectively, the side nearer the tree-trunk and the side nearer the vehicle. The front end is rigidly coupled to the front portion and a coupling portion comprising a front attachment and a rear attachment, the front attachment being coupled to the rear end of the linking portion and the rear attachment being fixedly coupled to the vehicle. The TTS is further characterized by comprising at least one vertical pivot defining a single lateral pivotal degree of freedom of motion in perpendicular to the trunk and to the tree-trunk jaws, the vertical pivot constraining the linking portion pivotally to the coupling portion.

Still another object of the invention is to provide a TTS coupled to a vehicle and comprising tree-trunk jaws clamping a trunk perpendicularly on diametrically opposite sides, a linear vibration generator integrated with at least one tree-trunk jaw into a rigid front portion, a linking portion in longitudinal coextension with the tree-trunk jaws, the linking portion comprising a front end and rear end rigidly coupled to the front portion, front and rear being defined as, respectively, the side nearer the tree-trunk and the side nearer the vehicle, the front end being rigidly coupled to the front portion and a coupling portion comprising a front attachment and a rear attachment, the front attachment being coupled to the rear end of the linking portion and the rear attachment being fixedly attached to the vehicle via a structure portion. The TTS is characterized by the linear vibration generator being configured for shaking the trunk laterally in perpendicular to the trunk and to the tree-trunk jaws, so as to transmit lateral vibrations to the trunk and to the linking portion. The TTS is further characterized by the coupling portion being constrained to the linking portion by at least one vertical pivot for associative operation when shaking the trunk, the vertical pivot coupling defining a single lateral pivotal degree of freedom of motion, thereby providing maximal vibration energy to the trunk by coupling the TTS to the vehicle via the structure. 15. The TTS is further characterized in that the at least one vertical pivot isolates the vehicle from vibrations generated by the linear vibration generator.

Still yet one other object of the invention is to provide a TTS that further comprises a linking portion, rigid and in longitudinal coextension with the tree-trunk jaws, the linking portion comprising a front end and rear end, front and rear being defined as, respectively, the side nearer the tree-trunk and the side nearer the vehicle. The TTS also comprises a coupling portion comprising a front attachment and a rear attachment, the front attachment being coupled to the rear end of the linking portion and the rear attachment being fixedly attached to the vehicle. The TTS is further characterized in that the front portion is coupled to the front end of the linking portion by a first vertical pivot coupling, and the rear end of the linking portion is coupled to the front attachment of the coupling portion by a second vertical pivot coupling. The TTS is thereby constrained to a single lateral degree of freedom of motion about a first and a second vertical pivot.

Moreover, it is an object of the invention to provide a TTS coupled to a vehicle and comprising tree-trunk jaws clamping a trunk perpendicularly on diametrically opposite sides, a linear vibration generator integrated with at least one tree-trunk jaw into a rigid front portion, a linking portion, rigid and in longitudinal coextension with the tree-trunk jaws, the linking portion comprising a front end and rear end, front and rear defined as, respectively, the side nearer the trunk and the side nearer the vehicle, a coupling portion comprising a front attachment and a rear attachment, the front attachment being coupled to the rear end of the linking portion and the rear attachment being fixedly coupled to the vehicle via a structure portion, and a lateral direction defined as being orthogonal to the trunk and to the tree-trunk jaws. The TTS is characterized by being configured for shaking the trunk laterally so as to transmit the vibrations laterally and in perpendicular to the linking portion, constrained by a first vertical pivotal coupling to the front portion and to the front end of the linking portion, and constrained by a second vertical pivotal coupling to the rear end of the linking portion and to the front end of the coupling portion, to define a single degree of lateral freedom of motion about two vertical pivots, thereby providing maximal vibration energy to the trunk by coupling the TTS to the vehicle via the structure. The TTS is further characterized in that the first vertical pivot and the second vertical pivot isolate the vehicle from vibrations generated by the linear vibration generator.

Furthermore, it is an object of the invention to provide a system with a TTS coupled to a vehicle to harvest tree-fruit, the system comprising tree-trunk jaws clamping the trunk perpendicularly, and a linear vibration generator coupled to the tree-trunk jaws and to the vehicle. The system is characterized by the TTS being configured to shake the trunk laterally in perpendicular to both the trunk and to the tree-trunk clamps, and the TTS being constrained to shake in one single lateral degree of freedom of motion in operative association with one vertical pivot coupling to the TTS to the vehicle. In the system, the tree-trunk jaws are clamping diametrically opposite sides of the trunk and the linear vibration generator is configured as an integral part of the at least one tree-trunk jaw to form a rigid front portion.

It is also an object of the invention to provide a system for tree-fruit harvesting comprising a TTS further comprising a linking portion, rigid and in longitudinal coextension with the tree-trunk jaws, the linking portion comprising a rear front end and rear end, front and rear being defined as, respectively, the side nearer the tree-trunk and the side nearer the vehicle, the front end being rigidly coupled to the front portion, and a coupling portion comprising a front attachment and a rear attachment, the front attachment being coupled to the rear end of the linking portion and the rear attachment being fixedly coupled to the vehicle. The system is further characterized by comprising at least one vertical pivot defining a single lateral pivotal degree of freedom of motion in perpendicular to the trunk and to the tree-trunk clamps, the vertical pivot constraining the linking portion pivotally to the coupling portion.

It is an object of the invention to provide a system for tree-fruit harvesting comprising a TTS further comprising tree-trunk jaws clamping a trunk perpendicularly on diametrically opposite sides, a linear vibration generator integrated with at least one tree-trunk jaw into a rigid front portion, a linking portion in longitudinal coextension with the tree-trunk jaws, the linking portion comprising a front end and rear end rigidly coupled to the front portion, front and rear being defined as, respectively, the side nearer the trunk and the side nearer the vehicle, and a coupling portion comprising a front attachment and a rear attachment, the front attachment being coupled to the rear end of the linking portion and the rear attachment being fixedly attached to the vehicle via a structure portion. The system is characterized by the linear vibration generator being configured for shaking the trunk laterally in perpendicular to the trunk and to the tree-trunk jaws, so as to transmit lateral vibrations to the tree-trunk and to the linking portion, and the coupling portion being constrained to the linking portion by a vertical pivot for associative operation when shaking the trunk, the vertical pivot coupling defining a single lateral pivotal degree of freedom of motion, thereby providing maximal vibration energy to the trunk by coupling the TTS to the vehicle via the structure. The system is further characterized in that the at least one vertical pivot isolates the vehicle from vibrations generated by the linear vibration generator.

It is another object of the invention to provide a system with a TTS further comprising a linking portion, rigid and in longitudinal coextension with the tree-trunk jaws, the linking portion comprising a front end and rear end, front and rear being defined as, respectively, the side nearer the tree-trunk and the side nearer the vehicle, and a coupling portion comprising a front attachment and a rear attachment, the front attachment being coupled to the rear end of the linking portion and the rear attachment being fixedly attached to the vehicle. The system is further characterized in that the front portion is coupled to the front end of the linking portion by a first vertical pivot coupling, and the rear end of the linking portion is coupled to the front attachment of the coupling portion by a second vertical pivot coupling, thereby constraining the TTS to a single lateral degree of freedom of motion about a first and a second vertical pivot.

It is still another object of the invention to provide a system for tree-fruit harvesting comprising a TTS further comprising a TTS coupled to a vehicle, to harvest tree-fruit, the system comprising tree-trunk jaws clamping a trunk perpendicularly on diametrically opposite sides, a linear vibration generator integrated with at least one tree-trunk jaw into a rigid front portion, a linking portion, rigid and in longitudinal coextension with the tree-trunk jaws, the linking portion comprising a front end and rear end, front and rear defined as, respectively, the side nearer the trunk and the side nearer the vehicle, a coupling portion comprising a front attachment and a rear attachment, the front attachment being coupled to the rear end of the linking portion and the rear attachment being fixedly coupled to the vehicle via a structure portion, and a lateral direction defined as being orthogonal to the trunk and to the tree-trunk jaws. The system is characterized by being configured for shaking the trunk laterally so as to transmit the vibrations laterally and in perpendicular to the linking portion, constrained to the front portion by a first vertical pivotal coupling at the front end of the linking portion, and constrained to the rear end of the linking portion by a second vertical pivotal coupling to the front end of the coupling portion, to define a single degree of lateral freedom of motion about two vertical pivots, thereby providing maximal vibration energy to the trunk by coupling the TTS to the vehicle via the structure. The system is further characterized in that the first vertical pivot and the second vertical pivot isolate the vehicle from vibrations generated by the linear vibration generator.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DESCRIPTION OF PREFERRED EMBODIMENTS

Tree Trunk Shakers (TTS) for tree-fruit harvesting are divided in two categories: a first category for multidirectional shaking and a second category for unidirectional or linear shaking.

It is assumed in the following that the shaking vibrations generator is adjacent to the tree-trunk clamping element and that the latter consists of two jaws that lock on diametrical opposite sides of the tree-trunk.

The Prior Art prefers multidirectional shaking, believed to achieve better harvest from the tree, and from its remote branches, as well as offering other favorable effects. This belief neglects the fact that the two clamping jaws lock only on diametrically opposite side of the trunk. It must be recognized that practically, all the shaking energy is transmitted via the jaws to the trunk only when the direction of shaking is perpendicular to both jaws, or in other words, for a shaking direction passing through the diametrically opposite sides of the tree-trunk clamped by both jaws.

Also to be recognized is the fact that when the direction of shaking is different form the above-mentioned direction of shaking, then there is a loss of shaking energy, the maximal loss occurring when the direction of shaking is parallel to both clamping jaws.

The term "loss of energy" is meant to express "loss of vibration energy imparted to the tree", in accordance with the principle of conservation of energy.

Figure 1:
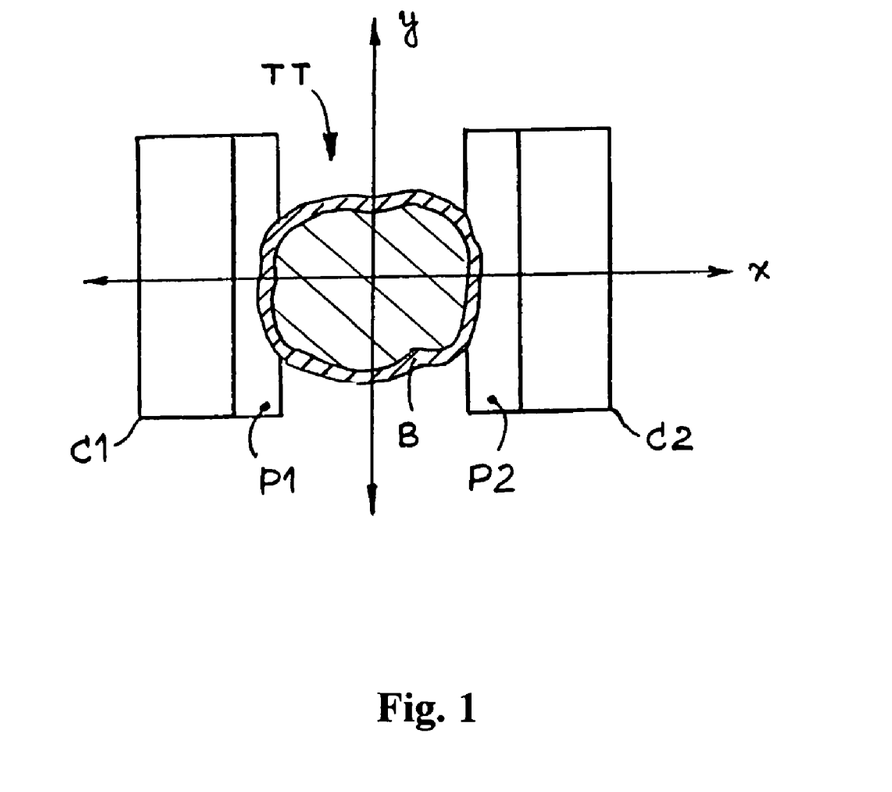
FIG. 1 is a diagrammatic cross-section of a tree-trunk locked between two clamping jaws.

FIG. 1 depicts the relative position of a first jaw J1 and a second jaw J2 locked on diametrically opposite sides of a tree-trunk TT. Each jaw J1 and J2 has a pad, respectively, P1 and P2, as is common practice in the art.

When the vibrations are oriented along the x-axis in FIG. 1, in perpendicular to the jaws J1 and J2 defined as the lateral direction, then, all the shaking energy is conveyed to the tree-trunk TT. In contrast, for a vibration orientation in the y-axis direction, defined as the longitudinal direction, in parallel to the jaws J1 and J2 and defined as the longitudinal direction, the maximum loss of energy is incurred, meaning that minimal shaking energy is transferred to the tree in that situation.

It is noted that the vibration energy that is not transferred to the trunk is dissipated in friction and in heat. The bark B of the tree-trunk TT suffers erosion and burning damage resulting from the friction exerted by the pads P1 and P2 on the tree-trunk TT.

Linear vibration generators for tree-trunk shaking are known in the art, but as mentioned above, they are suspended in a manner to allow multidirectional freedom of motion of the shaker. Such a free-floating suspension does not limit the direction of shaking to a single unique direction. Therefore, a freely suspended shaker does not only prevent the exploitation of all the shaking energy but allows the infliction of damage to the bark B of the tree-trunk.

The method disclosed in the present invention mechanically constrains the direction of shaking of a tree-trunk to a single and unique orientation. Advantage is taken of a linear vibration generator and of a mechanism configured to allow but a single degree of freedom of motion to shake the tree-trunk in a lateral direction. The invention thus controls the shaking regime of the tree-trunk TT, which is constrained to a particular predefined lateral direction in perpendicular to the tree-clutching jaws, J1 and J2, and to the tree. Reference may be made below to a tree-trunk as a trunk, and to tree-trunk jaws as tree-jaws, or trunk-jaws, or jaws for short.

The method disclosed in the present invention takes advantage of the single direction of motion of the shaker by inserting a motion-prevention pivot, to prevent vibrations from propagating to and through the TTS to the carrying vehicle. Direct advantages gained are fewer repairs of the TTS and of the vehicle, and a longer equipment life span.

There is thus disclosed a method for shaking a tree laterally, while constraining the TTS to only a lateral degree of freedom of motion. The unidirectional and orderly shaking of the trunk, in perpendicular to the jaws 6 and 8 ensures optimal harvesting results, while the lateral motion constraint prevents the newest shaking vibration from harming the TTS, the vehicle and the driver.

The method is applicable not only to a TTS mounted on a vehicle, but also to tree fruit harvesting systems that include a TTS, a vehicle, falling-fruit gathering means and possibly, conveyor means to harvest gathering containers.

The benefits offered by the present invention regard the fruit growers and the operators of TTS. The growers profit from a more efficient harvest, meaning that a larger percentage of the fruit growing on the tree is gathered, thus of a greater yield. The trees are not damaged and the bark remains safe.

In addition, the harvest of a tree is accelerated and the fruit is sooner on the market. A faster harvest permits to better base the decision about the harvesting time according to the ripeness and to the juice contents of the tree-fruit. Quicker harvesting also permits to avoid changing meteorological conditions, permitting to complete fruit gathering before bad weather sets in.

The TTS operators better employ their equipment, which harvests faster, and are able to serve more clients in a shorter time. They also derive a longer machine life-span form their equipment, which is better protected from harmful machine-incapacitating vibrations.

Figures 1, 2:
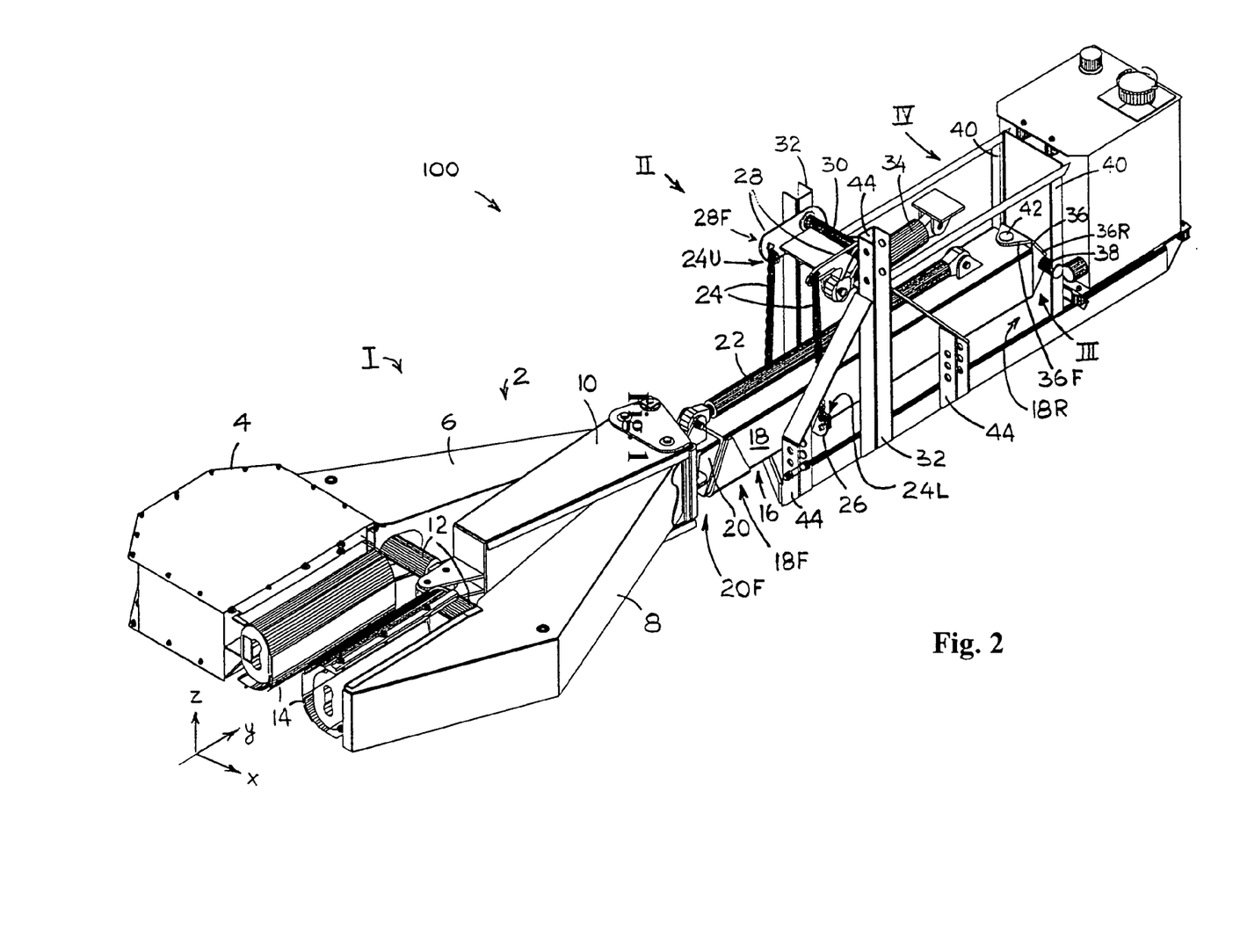
FIG. 2 presents a perspective view of a first embodiment.

FIG. 2 depicts a preferred embodiment 100 of a Tree-Trunk Shaker, TTS, carried by a vehicle. The vehicle is not shown in FIG. 2 for the sake of simplicity. Substantially, the TTS has three longitudinally aligned portions, namely, a front portion I, a linking portion II which is an intermediate portion, and a coupling portion III, which is a rear portion. Front refers to the side near the tree-trunk, while rear or back, relates to the side near the vehicle, thus away from the tree-trunk. The front portion I comprises mainly tree trunk-clamping jaws and a linear vibration generator. Portion II, the linking portion, is chiefly an axial, lockable and longitudinal extension and retraction boom. This mainly horizontal boom supports portion I at a first front end thereof and is coupled, at a second rear end, to the coupling portion III, which is a hinge element. Portion III couples between the linking portion II and a structure portion IV or structure IV, which is attached to and may be regarded as being part of the vehicle. The structure portion IV is possibly configured to carry additional equipment, besides the TTS, for example a container of liquid, such as hydraulic fluid.

In relation with a set of orthogonal coordinates having axes x, y and z, as shown in FIG. 2, with the origin at the soil-level and with the z-axis oriented vertically-up, as if along an imaginary tree-trunk, then the y-axis points towards the longitudinally aligned co-extensive portions I, II and III. (The tree-trunk is not shown in FIG. 2). The axes x, y and z thus define the, respectively, lateral, longitudinal, and vertical directions. The structure IV is a support structure releasably fixed to the vehicle, which is co-axial and aligned longitudinally with the TTS, mainly surrounding the portions II and III thereof.

The structure IV supports the boom and is mounted in perpendicular to the direction of motion of the vehicle. This configuration permits progress of the vehicle in parallel to a row of trees, to stop opposite a tree chosen to be shaken, extend the boom, clamp to and shake the tree for harvest. After opening the trunk clamping jaws, and retracting the boom, the vehicle moves to the next tree.

In FIG. 2, the front portion I comprises mainly clamping jaws 2 and a linear vibration generator 4 forming the rigid front portion. The tree-trunk clamping jaws 2 include a first jaw 6, a second jaw 8, and a jaws' support 10. A couple of jaw jacks 12 close and open the jaws 6 and 8 which swivel relative to the jaws' support 10 in parallel, substantially, to the horizontal plane defined by the axes x and y, thus in parallel to the ground. This accommodation easily allows the clamping jaws 6 and 8, each one lined with a pad 14, to clamp the diametrically opposite sides of a trunk.

The linear vibration generator 4 is fixedly attached adjacent, for example, to the first jaw 6. In fact, the linear vibration generator 4 is integrated inside a jaw, say the first jaw 6, and resides therefore also in the plane of the pair of jaws 6 and 8. The linear vibration generator 4 inside clamp 6 is thus almost in close contact to impart vibrations directly to the clamped tree-trunk.

For shaking, the linear vibration generator 4 is selected to operate linearly, at a predetermined frequency, and only in the lateral direction of the x-axis, thus in perpendicular to the longitudinally co-extensive portions I, II and III. An example of a linear vibration generator is disclosed in the International PCT Application No. PCT/IL 00/00716, by the present applicants, and is incorporated herewith in whole by reference.

The linking portion II comprises the elements required for suitably extending the front portion I, with the clamping jaws 2, towards and away from the tree-trunk. In operation, the vehicle is first adequately positioned at appropriate distance and orientation opposite the trunk to be shaken. Then, to clamp the tree-trunk, the jaws 6 and 8 are first opened by the pair of jaw jacks 12. Next, the clamping jaws 2 are extended towards the tree trunk, substantially in parallel to the ground, with each one of the jaws 6 and 8 in position on diametrically opposite sides of the tree-trunk. Last, the height of the clamping jaws 2 is adjusted vertically and the jaws 6 and 8 are locked tight on the tree-trunk Still referring to FIG. 2, a telescoping boom 16, or boom 16, is shown aligned horizontally in the longitudinal direction of the y-axis. The boom 16 includes an external static member 18 and an internal extensible member 20 that may be extended and retracted by help of a boom jack 22 mounted in parallel to the extensible member 20. The free end 20F of the extensible member 20 is solidly fastened to the jaws' support 10, while the rear end 18R of the static member 18 is retained by the coupling portion III.

With reference to FIG. 2, the telescopic boom 16 is shown in the retracted position, and so is the boom jack 22. When the boom jack 22 is operated to extend, by means not shown in FIG. 2, the extensible member 20 is extracted to translate outwardly and away from the free end 18F of the static member 18. The front portion I thus extends generally horizontally, in the longitudinal direction of the y-axis, towards a vertical tree-trunk (not shown in FIG. 2). After being adequately extended, the height of the clamping jaws 2 may be adjusted along the tree-trunk.

Once the clamping jaws 2 are clamped on the tree-trunk, the boom 16 is locked so that the extensible member 20 is also locked relatively to the static member 18. When locked, the boom 16 forms a rigid member together with the front portion I. The portions I and II thus become one solid structure. It is emphasized that when locked, the clamping jaws 2 are solidary with the boom 16 and may move only together therewith.

For the purpose of vertical height adjustment, the rear end 18R of the static member 18 of the boom 16 is coupled to the coupling portion III, which is retained by a horizontal pivot parallel to the lateral x-axis, thus perpendicular to the boom, providing a hinged connection or pivot for the boom, relative to the structure portion IV. The clamping jaws 2, fixedly attached to the free end 20F of the extensible member 20, are thus free to swivel up and down in a y-z plane, hence along the height of a tree-trunk.

To raise and lower the boom 16 during height adjustment, use is made of a chain, or preferably of a pair of chains 24, as lifting and lowering means. It is appreciated that for the sake of stability of the boom 16, it is preferable for the chains 24 not to hang in parallel to each other.

The pair of chains 24 have a lower end 24L thereof attached to ears 26 extending horizontally sideways and away in perpendicular to both opposite sides of the static member 18, of which only one side is seen in FIG. 2. The ears 26 are located nearer to the front-end 18F of the static member 18, closer to the tree-trunk clamping jaws 2. The upper end 24U of the pair of vertical height-adjusting chains 24 is attached to the free end 28F of a couple of parallel levers 28 pivoting together with a cross-member shaft 30 located higher above the beam 16 and pivotally retained by two parallel vertical side-beams 32 that are part of the structure IV. A height-positioning jack 34 raises or lowers the free ends 28F of the levers 28, thus acting on the chains 24 to vertically adjust the height of the extensible boom 16 to above or below the horizontal plane x-y. Thereby, the front portion I is accordingly, vertically risen or lowered above the ground.

To permit motion of the front portion I and of the linking portion II in the vertical direction of the z-axis, the retained rear end 18R of the beam 16 is pivotally coupled to the coupling portion III, relative to the structure IV. For this purpose, a bracket 36 is hinged or pivoted, at the rear 36R, around a horizontal pivot shaft 38 that is fixedly retained between two parallel spaced apart vertical rear side-beams 40 of the structure IV. The horizontal pivot shaft 38 is thus aligned laterally, in parallel to the x-axis, in perpendicular to the boom 16, to permit a single degree of freedom of pivotal motion, operated by the height-positioning jack 34, to translate the front portion I vertically along the direction of the z-axis.

In operation, the TTS and the carrying vehicle follow a sequence of phases for tree fruit harvesting. There is first an approach phase, wherein the TTS-carrying vehicle approaches a tree-trunk and parks opposite a tree in a manner adequate to enable the TTS to shake the tree-trunk. Next comes the positioning phase 2, or the second phase, in which the linking portion III is extended and the clamping jaws 2 are positioned and clamped on the tree-trunk. Now comes the shaking phase, or third phase, necessary for the harvesting of the tree, by shaking the trunk thereof. Once the harvesting is accomplished, then the departure phase, or fourth phase, is executed by opening the clamped jaws 6 and 8, retracting the boom 16, and letting the vehicle depart towards another tree.

There are thus different mechanisms of motion involved in the four sequential phases of tree-fruit harvesting. In the first approach phase, only the latitude of maneuver of the vehicle in the field is involved, without any motion demand being imposed on the TTS.

During the positioning and in the shaking phases, namely the second and third phases, the vehicle is at halt and it is only the TTS that imparts the motions required to extend the boom 16, clutch and shake the tree-trunk. For the departure or fourth phase, it is first the TTS that is put in motion by unclutching the trunk and retracting the boom 16, and second, the vehicle, which moves to depart. Thus, just before the shaking phase, the clamping jaws 2 are locked on the tree trunk and the shaking of that trunk for harvesting may begin.

The linear vibration generator 4 is now operated to produce unidirectional lateral vibrations in the direction of the x-axis, in perpendicular to the jaws 6 and 8, to the tree-trunk and to the extended boom 16. The amplitude of those vibrations cause the front portion I to translate only laterally in the x-y plane, in parallel to the ground, and to transmit lateral vibrations to the boom 16. To prevent the transmission of shocks and of vibrations, especially lateral vibrations, and the transmission of movement to the vehicle, there is provided only a single degree of freedom of motion about a vertical pivot shaft 42. That pivot shaft 42 is fixedly fastened at the rear end 18R of the static member 18, to form a hinge with the bracket 36, at the front 36F of that bracket, in the coupling portion III.

The coupling portion III is configured with a couple of perpendicular pivots 38 and 42, operating as a double hinge for pivotal movement constrained to two perpendicular directions. First, the vertical pivot shaft 42 hinges the rear of the static member 18R to the front 36F of the bracket 36, to permit a lateral degree of freedom of motion about a vertical axis. This constraint to a single lateral degree of freedom of pivotal motion agrees with the lateral translation movements of the front portion I, in parallel to the x-y plane, or to the ground, in perpendicular to the tree-trunk and to the longitudinally aligned portions I, II, and III of the TTS. Second, the horizontal pivot shaft 38, at the rear 36R of the bracket 36, hinges both integral portions I and II, namely the front portion I and the linking portion II to the structure IV, to allow a vertical degree of positioning adjustment motion. This single lateral degree of pivotal freedom of vertical motion evidently agrees with the translational movements required for positioning the front portion I along to the tree-trunk. The bracket 36 thus allows pivotal motion about two orthogonal axes represented by the pivots 38 and 42.

It is pointed out that pivoting about the horizontal shaft 38 is independent and decoupled from pivoting about the vertical pivot shaft 42. During the positioning phase, the TTS takes advantage of the horizontal pivot shaft 38. In contrast, in the shaking phase, when tree-shaking for harvesting, the TTS uses the vertical pivot shaft 42 to provide but one single lateral degree of freedom of pivotal motion, necessary to prevent the transmission of vibrations and of movement from the boom 16 to the vehicle. In the shaking phase, the front portion I and the linking portion II behave as one solid structure: the front portion is clamped on the trunk and rigidly coupled to the portion II, itself pivotable only laterally about the pivotal coupling 42. Motion about the horizontal pivot 38 is not possible.

It is noted that during shaking, the structure portion IV has but one task, which is to attach the coupling portion to the vehicle in one lateral direction of freedom of motion. Three parallel mounting struts 44, which are part of the support structure IV, are configured for releasable fastening to the rear of an agricultural vehicle, such as a tractor. The axis of motion of the vehicle is at right angle to the co-extensive portions I, II and III of the TTS.

In conclusion, during the shaking phase, the linear vibration generator 4 vibrates laterally and transmits lateral vibrations to the front portion I and to the linking portion II rigidly integral therewith. The coupling portion III pivotally constrains the portions I and II in a single pivotal degree of freedom of motion to the structure portion IV fixed to the vehicle. The TTS is thus constrained to orderly vibrate in the lateral direction, in perpendicular to the jaws 6 and 8 and to the boom 16 for maximum shaking efficiency, for prevention of bark erosion and for isolation of the vehicle from shocks and vibrations.

Figure 3:
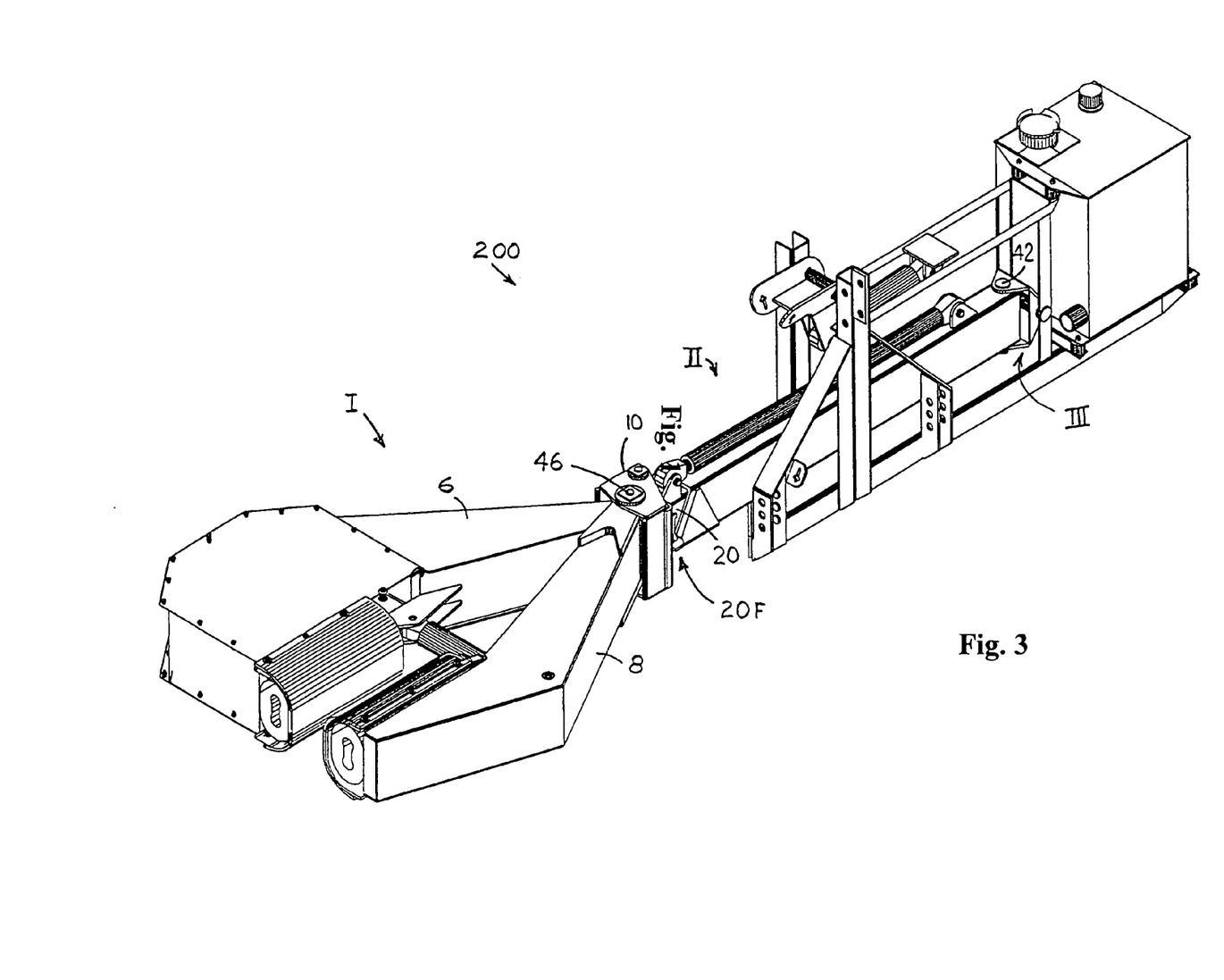
FIG. 3 illustrates a perspective view of a preferred embodiment.

A second TTS embodiment 200 is illustrated in FIG. 3, where the same numerals are used to designate similar elements. The main difference, in comparison to the embodiment 100, relates to the jaws' support 10 and to the coupling thereof to the free end 20F of the extensible member 20 of the boom 16. In the embodiment 200, the front portion I is pivotally coupled by a front portion vertical pivot 46 to the free end 20F. The front portion vertical pivot 46 is possibly also the common pivot for each one of the clamping jaws 6 and 8, or a separate pivot for the front portion I. When the jaw jacks 12 fully extend, the open jaws 6 and 8 are blocked against the jaws' support 10 that is thereby prevented from swiveling about the front portion vertical pivot 46 during the positioning phase. However, the lateral pivoting degree of freedom of motion of portion I, relative to portion II, is operative in the shaking phase.

The TTS 200 has thus two parallel vertical pivots that allow lateral swiveling during the shaking phase, namely the vertical pivot shaft 42 of the coupling portion III and the front portion vertical pivot 46. The degrees of freedom of motion in the positioning phase remain the same as with the embodiment 100, but the shaking phase now features two parallel vertical pivots. The front portion vertical pivot 46 provides a lateral degree of freedom of motion to the front portion I nearer to the linear vibration generator 4 than the vertical pivot shaft 42, without the needs for the whole length of the intermediate portion II to participate in lateral movement, about the vertical pivot shaft 42, although this option remains open.

The embodiment 200 is preferred and regarded as the best mode of implementation. The two separate vertical pivots 42 and 46 form, correspondingly, a primary pivot closer to the linear vibration generator 4, and a secondary pivot closer to the vehicle, for lateral motion isolation. Such a separation over two vertical pivots 42 and 46 is also a two-stage filter for the isolation of vibrations from reaching the vehicle and the driver.

Operation of the embodiment 200 is the same as for embodiment 100.

In this last embodiment 200 the same method for unidirectional orderly lateral shaking, lateral motion constraint and pivotal coupling to the structure IV as previously described is also implemented for a stand-alone vehicle-mounted TTS and for tree fruit harvesting systems.

It will be appreciated by persons skilled in the art, that the present invention is not limited to what has been particularly shown and described hereinabove. Rather, the scope of the present invention is defined by the appended claims and includes both combinations and sub-combinations of the various features described hereinabove as well as variations and modifications thereof which would occur to persons skilled in the art upon reading the foregoing description. For example, more than two vertical pivots may provide lateral freedom of motion. Moreover, the vertical motion of the boom 16 must not necessarily be commanded by the chains 24, but power jacks may replace them.

INDUSTRIAL APPLICABILITY

The present invention is applicable in agriculture for the harvesting of tree-fruit.

What is claimed is:

1. A method for constraining and coupling a TTS (Tree-Trunk Shaker) by a rear of a linking portion to a vehicle, the TTS comprising:
   tree-trunk jaws which perpendicularly clamp a tree trunk on diametrically opposite sides of the trunk,
   a linear vibration generator coupled to the tree-trunk jaws for shaking the trunk laterally perpendicular to both the trunk and the tree-trunk jaws, the linking portion being disposed in longitudinal coextension with the tree-trunk jaws, the linking portion comprising a front end and rear end, the front end and rear end being defined as, respectively, the side nearer the trunk and the side nearer the vehicle, and
   a coupling portion comprising a front attachment and a rear attachment, the front attachment being coupled to the rear end of the linking portion and the rear attachment being fixedly attached to the vehicle, the method comprising the steps of:
   constraining the TTS to shake the trunk in one single lateral degree of freedom of motion in operative association with at least one vertical pivot coupling the rear of the linking portion to the vehicle,
   coupling the front portion to the front end of the linking portion by a first vertical pivot coupling, and
   coupling the rear end of the linking portion to the front attachment of the coupling portion by a second vertical pivot coupling,
   thereby constraining the TTS to a single lateral degree of freedom of motion about a first and a second vertical pivot.

2. A method for constraining and coupling a TTS (Tree-Trunk Shaker), to a vehicle, the TTS comprising:
   tree-trunk jaws which perpendicularly clamp a tree trunk on diametrically opposite sides,
   a linear vibration generator for shaking the trunk and integrated with at least one tree-trunk jaw into a rigid front portion,
   a linking portion, rigid and in longitudinal coextension with the tree-trunk jaws, the linking portion comprising a front end and rear end, the front end and rear end being defined as, respectively, the side nearer the trunk and the side nearer the vehicle,
   a coupling portion comprising a front attachment and a rear attachment, the front attachment being coupled to the rear end of the linking portion and the rear attachment being fixedly coupled to the vehicle via a structure portion, and
   defining a lateral direction as being orthogonal to the trunk and to the tree-trunk jaws,
   the method comprising the steps of:
   configuring the TTS for shaking the trunk laterally so as to transmit vibrations laterally and in perpendicular to the linking portion,
   constraining the front portion by a first vertical pivotal coupling to the front end of the linking portion, and
   constraining the rear end of the linking portion by a second vertical pivotal coupling to the front end of the coupling portion, to define a single degree of lateral freedom of motion about two vertical pivots,
   thereby providing maximal vibration energy to the trunk by coupling the TTS to the vehicle via the structure portion.

3. The method, according to claim 2, further comprising the step of:
   isolating the vehicle from vibrations generated by the linear vibration generator by operative association with the first vertical pivot and the second vertical pivot.

\* \* \* \* \*